United States Patent [19]

Shibasaki et al.

[11] Patent Number: 5,336,653
[45] Date of Patent: Aug. 9, 1994

[54] CATALYST FOR ASYMMETRIC SYNTHESIS

[75] Inventors: Masakatsu Shibasaki, Mitaka; Hiroaki Sasai, Chiba, both of Japan

[73] Assignee: Chisso Corporation, Osaka, Japan

[21] Appl. No.: 970,867

[22] Filed: Nov. 3, 1992

[51] Int. Cl.$^5$ .............................................. B01J 31/00
[52] U.S. Cl. .................................... 502/170; 502/171
[58] Field of Search ................................ 502/170, 171

[56] References Cited

U.S. PATENT DOCUMENTS 5,128,429  7/1992  Towle et al. ........................ 528/174

OTHER PUBLICATIONS

Journal of American Chemical Society 1992, vol. 114, No. 11, pp. 4418–4420 (May 20, 1992).
Book of Abstracts, 17th Symposium on Progress in Organic Reactions and Syntheses, pp. 151–155 (under sponsorship of Japan Pharmaceutical Society on Nov. 7 and 8, 1991).
Program and Abstracts, the 50th Anniversary International Symposium on Organic Synthesis (under the sponsorship of the Society of synthetic Organic Chemistry on Aug. 3, 1992).

*Primary Examiner*—Patrick P. Garvin
*Assistant Examiner*—Brent M. Peebles
*Attorney, Agent, or Firm*—Leydig, Voit & Mayer

[57] ABSTRACT

The present invention provides a catalyst for asymmetric synthesis prepared from a dialkali metal salt of an optically active 2,2'-dihydroxy-1,1'-binaphthyl represented by the formula ($I_R$)

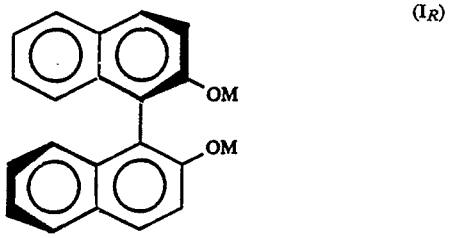

or the formula ($I_S$)

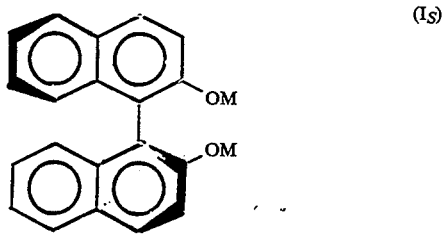

(wherein M is Li, K or Na), a lanthanum compound represented by $LaX_3$ (X is F, Cl, Br, I, $NO_3$ or $CH_3CO_2$) and an alkali metal alkoxide or an alkali metal hydroxide represented by MOR or MOH (M is Li, K or Na, and R is isopropyl or t-butyl), respectively, in the presence of a water-containing solvent. The catalyst of the present invention is extremely valuable as a catalyst for asymmetric synthesis of an asymmetric nitroaldol reaction useful in the synthesis of a β-hydroxynitro compound which is an important synthetic raw material for an optically active compound such as a medicine.

23 Claims, 2 Drawing Sheets

CATALYST FOR ASYMMETRIC SYNTHESIS

BACKGROUND OF THE INVENTION (i) Field of the Invention

The present invention relates to a catalyst for asymmetric synthesis containing an optically active lanthanum compound.

(ii) Description of the Related Art

The present inventors have prepared an optically active lanthanum compound from a dilithium salt of an optically active 2,2'-dihydroxy-1,1'-binaphthyl and a trivalent lanthanum chloride under anhydrous conditions, and they have found that this compound is useful as a catalyst of an asymmetric nitroaldol reaction (announced in Symposium about Advancement of Reaction and Synthesis under the sponsorship of Japan Pharmaceutical Society on Nov. 7, 1991).

However, the reaction yield or the asymmetric yield of the optically active lanthanum compound cannot be reproduced at all. Although the asymmetric nitroaldol reaction is substantially an extremely useful reaction for providing an important synthetic raw material for a physiologically active compound, its usefulness cannot be sufficiently utilized. Thus, in order to industrially prepare a medicine which is effectively manufacturable only by the asymmetric nitroaldol reaction, it is necessary to develop a catalyst for asymmetric synthesis having the high reaction yield and the asymmetric yield as well as the reproducibility.

SUMMARY OF THE INVENTION

An object of the present invention is to provide a catalyst for asymmetric synthesis, and another object of the present invention is to provide an active species having reproducibility in an asymmetric nitroaldol reaction.

The present inventors have intensively researched a kind of raw material, purity, reaction conditions and the like. As a result, they have elucidated that a cause of the above-mentioned disadvantages resides in an optically active lanthanum compound which functions as an asymmetric catalyst of the asymmetric nitroaldol reaction, and they have found an active species capable of retaining the complete reproducibility in this reaction. Thus, the present invention has now been attained.

That is, a first catalyst for asymmetric synthesis of the present invention is characterized by being prepared from a dialkali metal salt of an optically active 2,2'-dihydroxy-1,1'-binaphthyl represented by the formula ($I_R$)

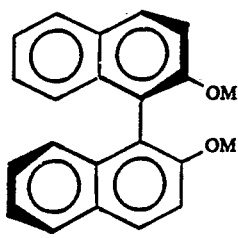

or the formula ($I_S$)

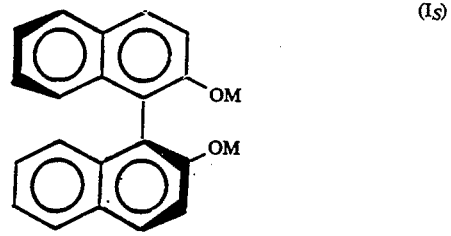

(wherein M is Li, K or Na), a lanthanum compound represented by $LaX_3$ (X is F, Cl, Br, I, $NO_3$ or $CH_3CO_2$) and an alkali metal alkoxide or an alkali metal hydroxide represented by MOR or MOH (M is Li, K or Na, and R is isopropyl or t-butyl), respectively, in the presence of a water-containing solvent.

In a preferable embodiment, the above-mentioned preparation is carried out in an ether solvent or a water-containing ether solvent. Furthermore, it is preferred that a molar ratio of the dialkali metal salt of the active 2,2'-dihydroxy-1,1'-binaphthyl, the lanthanum compound and the alkali metal alkoxide or the alkali metal hydroxide is in the range of 1:1:1 to 1:1:2.

A second catalyst for asymmetric synthesis of the present invention is characterized by using, in the presence of lithium chloride and a water-containing solvent, an active species obtained from an optically active 2,2'-dihydroxy-1,1'-binaphthyl represented by the formula ($II_R$)

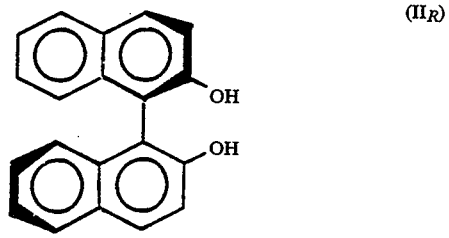

or the formula ($II_S$)

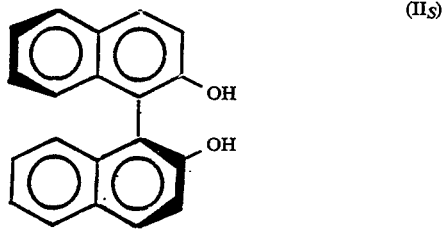

and a lanthanum alkoxide represented by $La(OR)_3$ (R is isopropyl or t-butyl).

In a preferable embodiment, the lanthanum alkoxide is a solution of an ether solvent. Furthermore, a usable molar ratio of the optically active 2,2'-dihydroxy-1,1'-binaphthyl to the lanthanum alkoxide is in the range of 2:1 to 1:1, but it is preferably 3:2.

DETAILED DESCRIPTION OF PREFERRED EMBODIMENTS

Figure 1:
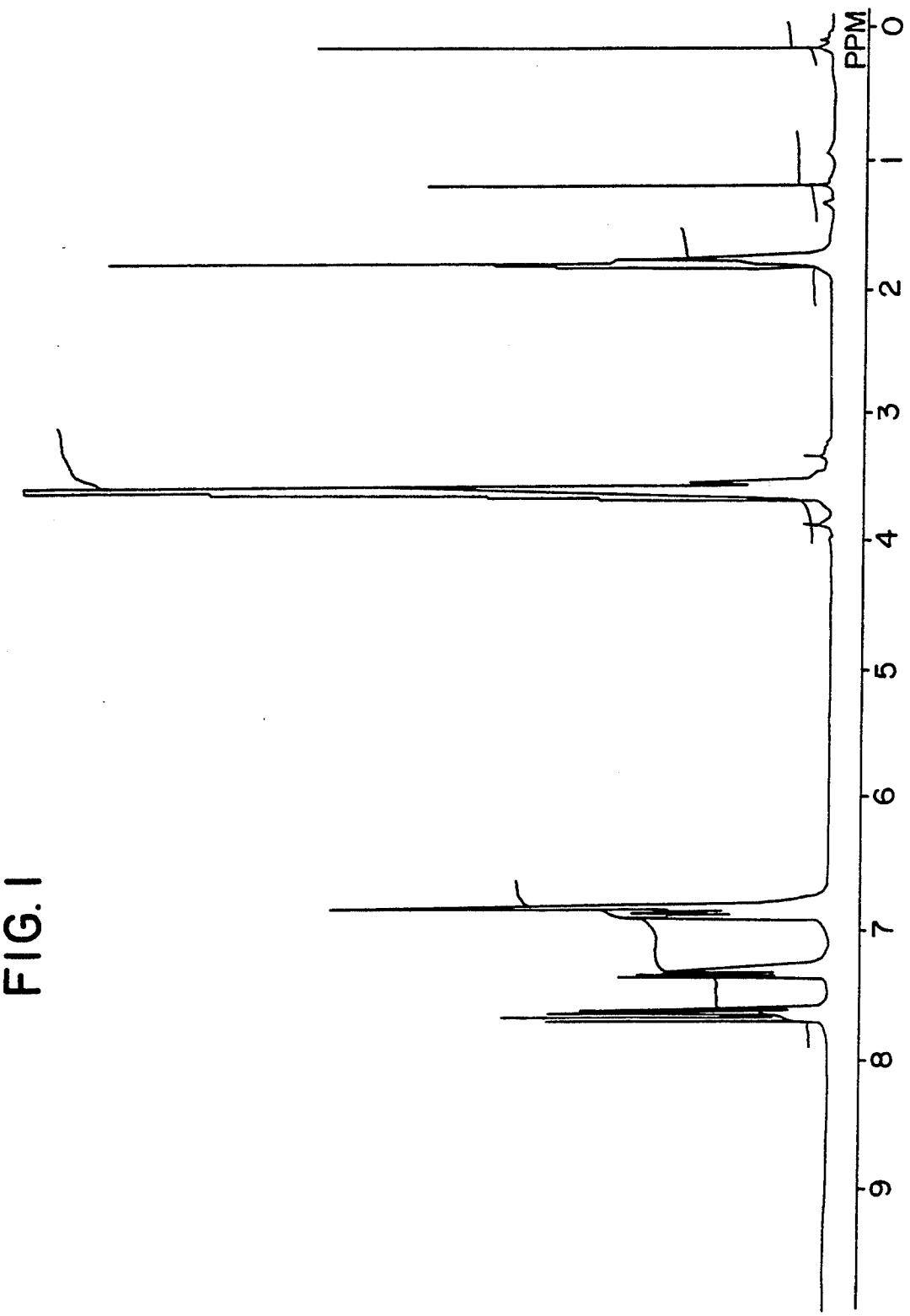
FIG. 1 shows an $^1$H-NMR spectrum of a catalyst for asymmetric synthesis of the present invention.

A dialkali metal salt of an optically active 2,2'-dihydroxy-1,1'-binaphthyl which is used in a catalyst for asymmetric synthesis of the present invention can be prepared by a process in which the optically active 2,2'-dihydroxy-1,1'-binaphthyl is reacted with an alkali metal hydride such as potassium hydride, sodium hydride or lithium hydride in an aprotic solvent such as THF, or another process in which the optically active 2,2'-dihydroxy-1,1'-binaphthyl is reacted with an alkali metal hydroxide such as potassium hydroxide, sodium hydroxide or lithium hydroxide in a protic solvent such as water or an alcohol, followed by drying.

Examples of a lanthanum compound represented by $LaX_3$ which is used in the catalyst of the present invention include a lanthanum halide such as lanthanum chloride and trivalent lanthanum compounds such as lanthanum nitrate and lanthanum acetate.

Preferable examples of an alkali metal alkoxide include sodium t-butoxide, potassium t-butoxide, lithium t-butoxide, potassium isopropoxide, sodium isopropoxide and lithium isopropoxide.

Water which is essential for the preparation of the catalyst of the present invention can be introduced into a reaction system by any one of the following manners: (1) hydrates of trivalent lanthanum compounds such as lanthanum chloride.heptahydrate, lanthanum nitrate.nonahydrate and lanthanum acetate.n hydrate, and (2) an ether-based solvent such as water-containing THF, water-containing dioxane and water-containing diethyl ether. The water added to the reaction system accelerates a smooth reaction of the trivalent lanthanum compound which is insoluble in an organic solvent with a binaphthyl derivative, and acts on the production of the optically active lanthanum compound having a high asymmetric induction ability. The amount of water to be used is preferably in the range of 1 to 20 mol equivalents, more preferably 10 mol equivalents per mol equivalent of the trivalent lanthanum compound which is the raw material.

With regard to an absolute configuration of the optically active 2,2'-dihydroxy-1,1'-binaphthyl which is used in the present invention, both R and S enantiomers can be used.

Typical examples of the optically active 2,2'-dihydroxy-1,1'-binaphthyl include (R)-(+)-2,2'-dihydroxy-1,1'-binaphthyl represented by the above-mentioned formula ($II_R$) and (S)-(−)-2,2'-dihydroxy-1,1'-binaphthyl represented by the formula ($II_S$).

A lanthanum alkoxide which is used in the catalyst of the present invention can be prepared in the reaction system by a known procedure [J. Am. Chem. Soc., 110, p. 1841 (1988)], and the prepared lanthanum alkoxide may be directly used as it is, or it may be used after isolation and purification.

The catalyst of the present invention contains an optically active lanthanum compound having a fundamental structure unit of a lanthanum binaphthoxide represented by the following formula:

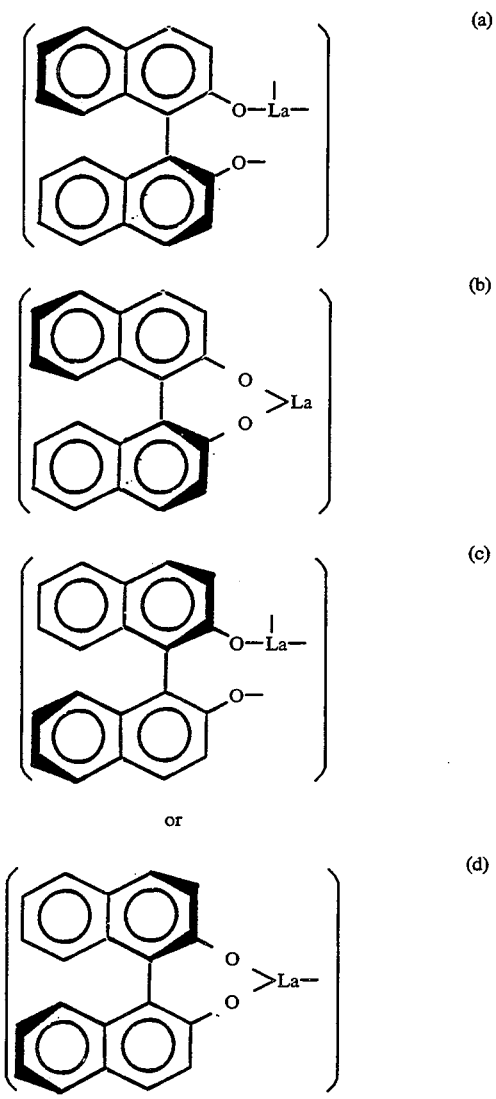

That is, a rare earth element of the lanthanum has various bonding modes which are characteristics inherent in this element, and thus this optically active lanthanum compound is a mixture of this monomer, a dimer, a trimer, an oligomer and a polymer including a halogen atom, a lanthanum atom or an alkali metal atom as a cross linking atom. They are stably produced structurally and in point of a constitutional ratio as an active species having a high catalytic activity to an asymmetric nitroaldol reaction, only when water is present at the time of the preparation.

The catalyst of the present invention can be easily prepared, for example, by suspending lanthanum tri-t-butoxide in water-containing THF, adding an optically active 2,2'-dihydroxy-1,1'-binaphthyl thereto at room temperature, stirring the mixture for 2 hours, and then adding water and lithium chloride, or alternatively by suspending lanthanum trichloride.heptahydrate in water-containing THF, adding a dilithium salt of an optically active 2,2'-dihydroxy-1,1'-binaphthyl thereto, successively adding sodium t-butoxide or an alkali metal oxide and water, and stirring this mixture for 3 days.

The catalyst of the present invention is extremely valuable as an asymmetric catalyst of an asymmetric nitroaldol reaction useful in the synthesis of a β-hydroxynitro compound which is an important synthetic raw material for an optically active compound such as a medicine, for example, an optically active propranolol.

EXAMPLES

Now, the present invention will be described in detail in reference to examples.

EXAMPLE 1

Figure 2:
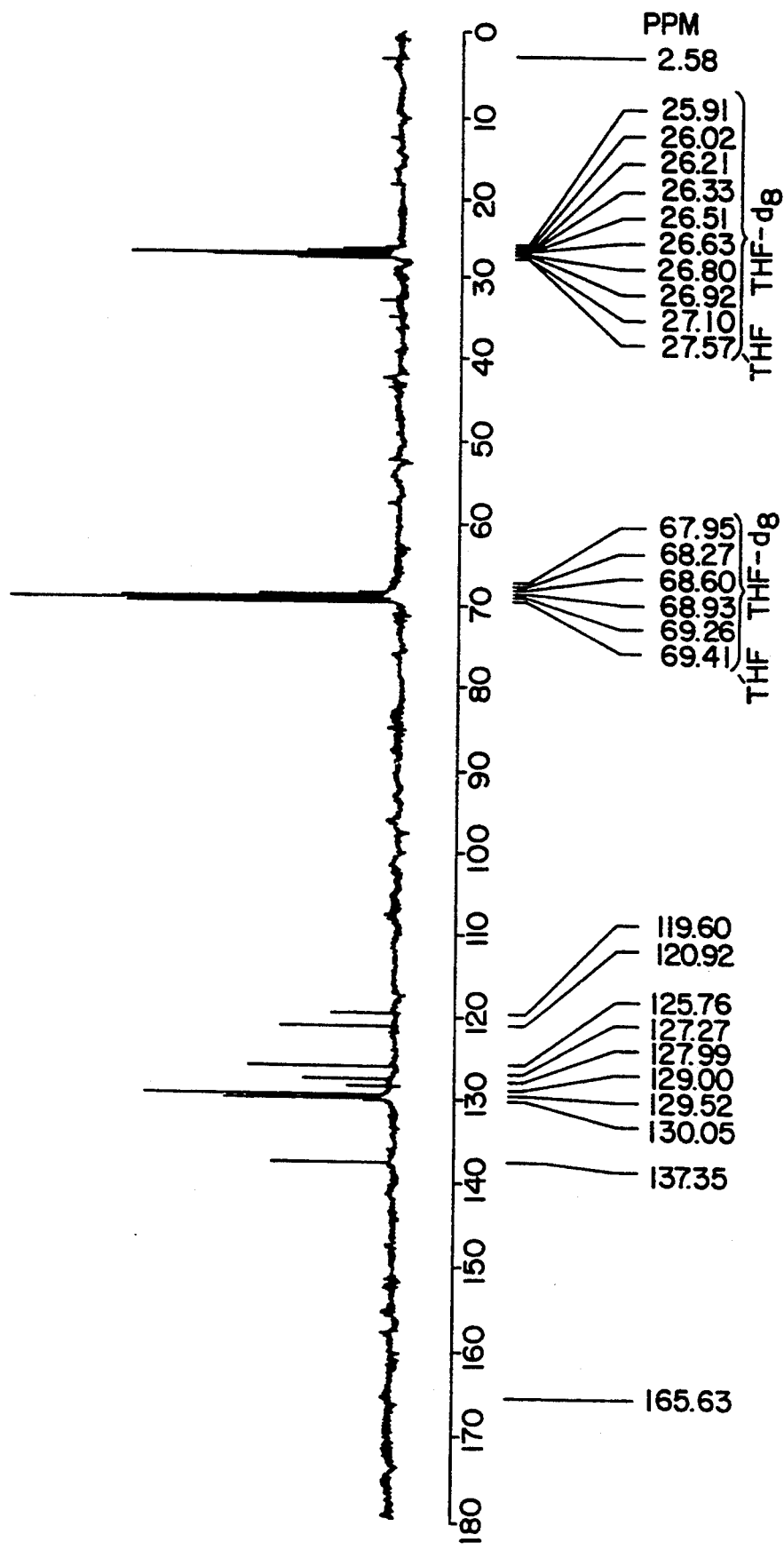
FIG. 2 shows a $^{13}$C-NMR spectrum of the catalyst for asymmetric synthesis of the present invention.

Under a nitrogen atmosphere, 159 mg (0.56 mmol) of (S)-2,2'-dihydroxy-1,1'-binaphthyl were added to 7.56 cm$^3$ ($4.9 \times 10^{-2}$ mol.dm$^{-3}$ as a monomer) of a THF solution of lanthanum tri-t-butoxide at room temperature, followed by stirring for 2 hours, to prepare a catalyst solution for asymmetric synthesis. The solvent was removed from the solution to give a catalyst, and $^1$H-NMR (THF-d$_8$) and $^{13}$C-NMR (THF-d$_8$) of the catalyst were measured by means of a JEOL GX-270 spectral meter. The results are set forth in FIGS. 1 and 2, respectively.

EXAMPLE 2

Under a nitrogen atmosphere, to 9 cm$^3$ of a THF suspension of 371 mg (1 mmol) of lanthanum trichloride.heptahydrate were added 298 mg (1 mmol) of a dilithium salt of (R)-2,2'-dihydroxy-1,1'-binaphthyl, 192 mg (2 mmol) of sodium t-butoxide and 1 cm$^3$ of a THF solution containing 180 mg (10 mmol) of water in this order, followed by stirring at room temperature for 3 days, to prepare a catalyst for asymmetric synthesis.

EXAMPLE 3

Under a nitrogen atmosphere, to 9 cm$^3$ of a THF suspension of lanthanum chloride (1 mmol) were added a dilithium salt (1 mmol) of (S)-(−)-2,2'-dihydroxy-1,1'-binaphthyl, sodium t-butoxide (2 mmol) and 1 cm$^3$ of a THF solution containing water (10 mmol) in this order, followed by stirring at room temperature for 3 days, to prepare a catalyst for asymmetric synthesis.

EXAMPLE 4

Under a nitrogen atmosphere, 159 mg (0.56 mmol) of (S)-2,2'-dihydroxy-1,1'-binaphthyl were added to 7.56 cm$^3$ of a THF solution of lanthanum tri-t-butoxide ($4.9 \times 10^{-2}$ mol.dm$^{-3}$ as a monomer) at room temperature, followed by stirring for 2 hours. In the presence of 10 mol % (based on La) of the resultant solution, 2 mol equivalents (based on La) of LiCl and 10 mol equivalents (based on La) water, cyclohexylaldehyde reacted with nitromethane (10 equivalents) in tetrahydrofuran at −42° C. for 18 hours to give 1-cyclohexyl-2-nitroethanol represented by the formula

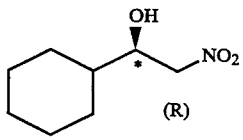

With an optical purity of 90% ee. in a yield of 91%.

EXAMPLES 5 AND 6

The same procedure as in Example 4 was effected except that a kind of aldehyde was changed. The results are set forth in Table 1.

TABLE 1

| RCHO | | yield (%) | ee (%) |
|---|---|---|---|
| Example 5 | R = PhCH$_2$CH$_2$ | 79 | 73 |
| Example 6 | R = i-Pr | 80 | 85 |

What is claimed is:

1. A catalyst for asymmetric synthesis comprising a dialkali metal salt of an optically active 2,2'-dihydroxy-1,1'-binaphthyl represented by the formula (I$_R$)

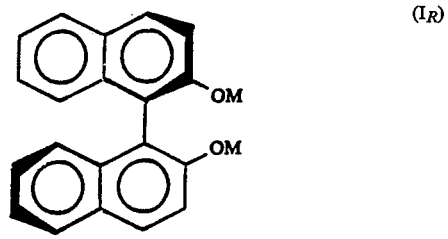

or the formula (I$_S$)

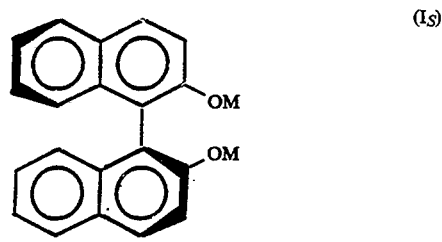

(wherein M is Li, K or Na), a lanthanum compound represented by LaX$_3$ (wherein X is F, Cl, Br, I, NO$_3$ or CH$_3$CO$_2$) and an alkali metal alkoxide or an alkali metal hydroxide represented by MOR or MOH (wherein M is Li, K or Na, and R is isopropyl or t-butyl), respectively, and a water-containing solvent.

2. The catalyst for asymmetric synthesis according to claim 1 wherein the water-containing solvent is a water-containing ether solvent.

3. The catalyst for asymmetric synthesis according to claim 1 wherein a molar ratio of the dialkali metal salt of the optically active 2,2'-dihydroxy-1,1'-binaphthyl, the lanthanum compound and the alkali metal alkoxide or the alkali metal hydroxide is in the range of 1:1:1 to 1:1:2, respectively.

4. The catalyst for asymmetric synthesis according to claim 1 wherein the lanthanum compound is in the form of a hydrate, and the water-containing solvent is a water-containing ether solvent.

5. A catalyst for asymmetric synthesis comprising a dialkali metal salt of an optically active 2,2'-dihydroxy-1,1'-binaphthyl represented by the formula (I$_R$)

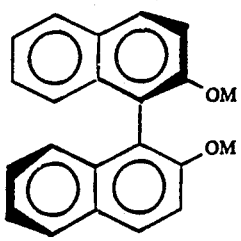

or the formula (I$_S$)

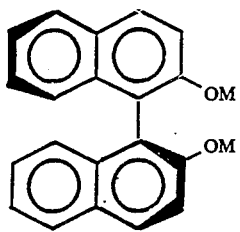

(wherein M is Li, K or Na), lanthanum chloride.heptahydrate and sodium t-butoxide or sodium hydroxide in water-containing tetrahydrofuran.

6. A catalyst for asymmetric synthesis which is comprising lithium chloride and a water-containing solvent, an active species obtained from an optically active 2,2'-dihydroxy-1,1'-binaphthyl represented by the formula (II$_R$)

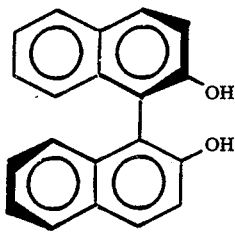

or the formula (II$_S$)

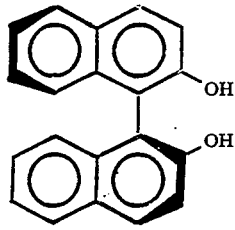

and a lanthanum alkoxide represented by La(OR)$_3$ (wherein R is isopropyl or t-butyl).

7. The catalyst for asymmetric synthesis according to claim 6 wherein said water-containing solvent is a water-containing ether solvent.

8. The catalyst for asymmetric synthesis according to claim 6 wherein a molar ratio of the optically active 2,2'-dihydroxy-1,1'-binaphthyl to the lanthanum alkoxide is in the range of 2:1 to 1:1.

9. A method of preparing a catalyst for asymmetric synthesis comprising:

combining a dialkali metal salt of an optically active 2,2'-dihydroxy-1,1'-binaphthyl represented by the formula (I$_R$)

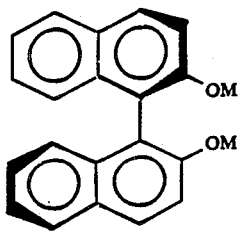

or the formula (I$_S$)

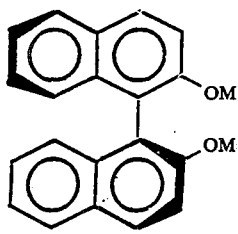

(wherein M is Li, K or Na), a lanthanum compound represented by LaX$_3$ (wherein X is F, Cl, Br, I, NO$_3$ or CH$_3$CO$_2$) and an alkali metal alkoxide or an alkali metal hydroxide represented by MOR or MOH (wherein M is Li, K or Na, and R is isopropyl or t-butyl), respectively, and a water-containing solvent, and mixing the aforementioned.

10. The method according to claim 9 wherein the water-containing solvent is a water-containing ether solvent.

11. The method according to claim 9 wherein a molar ratio of the dialkali metal salt of the optically active 2,2'-dihydroxy-1,1'-binaphthyl, the lanthanum compound and the alkali metal alkoxide or the alkali metal hydroxide is in the range of 1:1:1 to 1:1:2, respectively.

12. The method according to claim 9 wherein the lanthanum compound is in the form of a hydrate, and the water-containing solvent is a water-containing ether solvent.

13. The method according to claim 9 comprising a dialkali metal salt of an optically active 2,2'-dihydroxy-1-1'-binaphthyl represented by the formula (I$_R$)

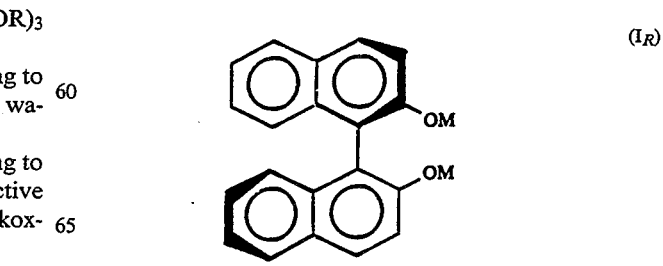

or the formula (I$_S$)

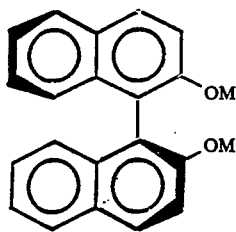

(wherein M is Li, K or La), lanthanum chloride.heptahydrate and sodium t-butoxide or sodium hydroxide in water-containing tetrahydrofuran.

14. A method of preparing a catalyst for asymmetric synthesis comprising combining lithium chloride and a water-containing solvent, an active species obtained from an optically active 2,2'-dihydroxy-1,1'-binaphthyl represented by the formula ($II_R$)

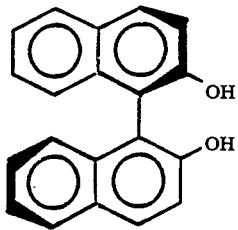

or the formula ($II_S$)

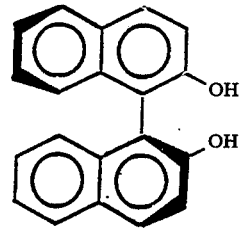

and a lanthanum alkoxide represented by La(OR)$_3$ (wherein R is isopropyl or t-butyl).

15. The method according to claim 14 wherein said water-containing solvent is a water-containing ether solvent.

16. The method according to claim 15 wherein a molar ratio of the optically active 2,2'-dihydroxy-1-1'-binaphthyl to the lanthanum alkoxide is in the range of 2:1 to 1:1.

17. The method according to claim 10 wherein said water-containing ether solvent is a water-containing tetrahydrofuran solvent.

18. The catalyst for asymmetric synthesis according to claim 2 wherein said water-containing ether solvent is a water-containing tetrahydrofuran solvent.

19. The catalyst for asymmetric synthesis according to claim 2 wherein said water-containing ether solvent is a water-containing diethyl ether solvent.

20. The catalyst for asymmetric synthesis according to claim 2 wherein the water-containing ether solvent is a water-containing dioxane solvent.

21. The catalyst for asymmetric synthesis according to claim 1 wherein said lanthanum compound comprises lanthanum chloride.

22. The catalyst for asymmetric synthesis according to claim 1 wherein said lanthanum compound comprises lanthanum nitrate.

23. The catalyst for asymmetric synthesis according to claim 1 wherein said lanthanum compound comprises lanthanum acetate.

* * * * *

UNITED STATES PATENT AND TRADEMARK OFFICE
CERTIFICATE OF CORRECTION

PATENT NO. : 5,336,653

DATED : August 9, 1994

INVENTOR(S) : SHIBASAKI et al.

It is certified that error appears in the above-identified patent and that said Letters Patent is hereby corrected as shown below:

Column 9, line 15, change "La" to --Na--.

Signed and Sealed this

Twenty-second Day of November, 1994

Attest:

BRUCE LEHMAN

*Attesting Officer*          *Commissioner of Patents and Trademarks*